US008328319B2

(12) United States Patent  
Tamaoki (10) Patent No.: US 8,328,319 B2  
(45) Date of Patent: Dec. 11, 2012

(54) PRINT CONTROL APPARATUS, PRINT CONTROL METHOD, AND STORAGE MEDIUM

(75) Inventor: Ryoji Tamaoki, Kani (JP)

(73) Assignee: Seiko Epson Corporation, Tokyo (JP)

( * ) Notice: Subject to any disclaimer, the term of this patent is extended or adjusted under 35 U.S.C. 154(b) by 721 days.

(21) Appl. No.: 12/576,950

(22) Filed: Oct. 9, 2009

(65) Prior Publication Data

US 2010/0097422 A1    Apr. 22, 2010

(30) Foreign Application Priority Data

Oct. 10, 2008    (JP) ................. 2008-263576

(51) Int. Cl.
*B41J 29/38* (2006.01)
(52) U.S. Cl. .............. 347/16; 399/12; 235/494
(58) Field of Classification Search ............ 347/5, 14, 347/16, 19; 235/494; 399/12
See application file for complete search history.

(56) References Cited

U.S. PATENT DOCUMENTS

| 7,171,131 B2 * | 1/2007 | Maruyama et al. ............. 399/12 |
| 2008/0203177 A1 | 8/2008 | Yumoto ....................... 235/494 |

FOREIGN PATENT DOCUMENTS

| JP | 04-114558 | 4/1992 |
| JP | 08-278723 | 10/1996 |
| JP | 10-203717 | 8/1998 |
| JP | 2003-114598 | 4/2003 |
| JP | 2006-031427 | 2/2006 |
| JP | 2006-224350 | 8/2006 |
| JP | 2006-256106 | 9/2006 |
| JP | 2008-210136 | 9/2008 |

* cited by examiner

*Primary Examiner* — Lam S Nguyen
(74) *Attorney, Agent, or Firm* — DLA Piper LLP (US)

(57) ABSTRACT

A print control apparatus includes a setting section and a print controlling section. The setting section enables or disables a first function of sorting paper by performing longitudinal printing in which printing is performed in longitudinal orientation for paper ejection in the longitudinal orientation and lateral printing in which printing is performed in lateral orientation for paper ejection in the lateral orientation alternately. The setting section further enables or disables a second function of barcode printing. The print controlling section controls printing in accordance with setting of each of the first function and the second function. When one of the first function and the second function is enabled, the setting section disables the other function.

5 Claims, 7 Drawing Sheets

PRINT CONTROL APPARATUS, PRINT CONTROL METHOD, AND STORAGE MEDIUM

BACKGROUND

1. Technical Field

The present invention relates to a print control apparatus, a print control method, and a print control program for controlling barcode printing.

2. Related Art

In barcode printing, printing conditions such as a sheet type, print density, and the like might affect the quality of a printed bar code. In view of this fact, a printing apparatus that is capable of printing a bar code in high quality by setting printing conditions that are suitable for barcode printing is known in the art. For example, a printing apparatus that is disclosed in JP-A-2006-224350 finds a type of sheets that is suitable for barcode printing and then prints a barcode image thereon, thereby achieving high-quality barcode printing. As another example, a printing apparatus that is disclosed in JP-A-2006-256106 automatically changes the bar width of a bar code so as to ensure that the highest barcode read rate is obtained. By this means, the printing apparatus of the related art achieves high-quality barcode printing.

A separate printing function is known as a function of a printing apparatus as described in, for example, JP-A-8-278723 and JP-A-2003-114598. In separate printing, longitudinal printing and lateral printing are performed alternately. Printing is performed with a sheet of paper being oriented in a longitudinal direction (e.g., portrait orientation) in the longitudinal printing. Printing is performed with a sheet of paper being oriented in a lateral direction (e.g., landscape orientation) in the lateral printing. Printed sheets of paper are then ejected with orientation being alternated between longitudinal orientation and lateral orientation for the purpose of sorting. The separate printing function makes it possible to automatically sort printed sheets with an orientation switchover for every copy or every print job, which saves the trouble of manual sorting. Therefore, the separate printing function is very useful and convenient function for a user.

However, when a printer performs barcode printing while switching paper orientation over between a longitudinal direction and a lateral direction alternately, the print quality of bar codes that are outputted as a result of longitudinal printing may differ from the print quality of bar codes that are outputted as a result of lateral printing. When a barcode reader is used to scan these bar codes, the read rate of bar codes printed by one of the longitudinal printing and the lateral printing could be lower than the read rate of bar codes printed by the other. That is, there is a possibility that the print quality of bar codes deteriorates when alternate longitudinal/lateral paper-orientation switchover ejection is applied to barcode printing.

SUMMARY

In order to address the above-identified problems without any limitation thereto, the invention provides, as various aspects thereof, a print control apparatus, a print control method, and a print control program having the following novel and inventive features.

APPLICATION EXAMPLE 1

First Aspect

A print control apparatus including: a setting section that enables or disables a first function of sorting paper by performing longitudinal printing in which printing is performed in longitudinal orientation for paper ejection in the longitudinal orientation and lateral printing in which printing is performed in lateral orientation for paper ejection in the lateral orientation alternately, the longitudinal orientation being an orientation in which an extending direction of long edges of a sheet of paper coincides with a direction of transportation of the sheet of paper, the lateral orientation being an orientation in which the extending direction of the long edges of the sheet of paper coincides with a direction orthogonal to the transportation direction, the setting section further enabling or disabling a second function of barcode printing; and a print controlling section that controls printing in accordance with setting of each of the first function and the second function, wherein the setting section disables, when one of the first function and the second function is enabled, the other function.

Exclusive setting control is performed on the first function and the second function. That is, when one of the first function and the second function is enabled, the other function is disabled. With such a configuration, it is possible to avoid the printing of a bar code with the use of the first function, which performs the longitudinal printing and the lateral printing alternately, when the second function of barcode printing is enabled. Therefore, it is possible to prevent barcode quality from varying depending on print orientation, which would occur if the first function were used to print bar codes while alternating the longitudinal printing and the lateral printing. Thus, it is possible to print bar codes in high quality, which is free from quality variation.

APPLICATION EXAMPLE 2

It is preferable that the print control apparatus according to the first aspect of the invention should further include: an operating section that is used for input operation; and a displaying section that performs screen picture display, wherein the setting section causes the displaying section to display screen picture that contains a first setting input area item that is used for setting the first function and a second setting input area item that is used for setting the second function, and when a command for enabling the first function or the second function is given as setting of the first setting input area item or the second setting input area item as a result of input operation performed by means of the operating section, the setting section enables the commanded function and renders the setting input area item for the other function dead.

With such a preferred configuration, the setting input area item for the other function becomes dead when one of the first function and the second function is enabled. Therefore, the dead function cannot be enabled. Thus, exclusive control is performed on the first function and the second function.

APPLICATION EXAMPLE 3

It is preferable that the print control apparatus according to the first aspect of the invention should further include: an operating section that is used for input operation; and a displaying section that performs screen picture display, wherein the setting section causes the displaying section to display screen picture that prompts a user to select either one of the first function and the second function when it is commanded that, when one of the first function and the second function is enabled, the other function should also be enabled as a result of input operation performed by means of the operating section, and then enables only one function that is selected by the user as a result of input operation performed by means of the operating section.

With such a preferred configuration, when it is commanded that the other function should also be enabled when one of the first function and the second function is enabled, screen picture is displayed so that a user can selectively enable either one of the first function and the second function as prompted by the screen picture displayed on the displaying section. Thus, exclusive control is performed on the first function and the second function for selectively enabling only one function that is preferred by the user.

APPLICATION EXAMPLE 4

A print control method including: setting for enabling or disabling a first function of, sorting paper by performing longitudinal printing in which printing is performed in longitudinal orientation for paper ejection in the longitudinal orientation and lateral printing in which printing is performed in lateral orientation for paper ejection in the lateral orientation alternately, the longitudinal orientation being an orientation in which an extending direction of long edges of a sheet of paper coincides with a direction of transportation of the sheet of paper, the lateral orientation being an orientation in which the extending direction of the long edges of the sheet of paper coincides with a direction orthogonal to the transportation direction, and further enabling or disabling a second function of barcode printing; and controlling printing in accordance with setting of each of the first function and the second function, wherein, when one of the first function and the second function is enabled, the other function is disabled.

With such a print control method, exclusive setting control is performed on the first function and the second function. Thus, it is possible to print bar codes in high quality free from quality variation.

APPLICATION EXAMPLE 5

A print control program for controlling a printing apparatus, the print control program causing a computer to function as: a setting section that enables or disables a first function of sorting paper by performing longitudinal printing in which printing is performed in longitudinal orientation for paper ejection in the longitudinal orientation and lateral printing in which printing is performed in lateral orientation for paper ejection in the lateral orientation alternately, the longitudinal orientation being an orientation in which an extending direction of long edges of a sheet of paper coincides with a direction of transportation of the sheet of paper, the lateral orientation being an orientation in which the extending direction of the long edges of the sheet of paper coincides with a direction orthogonal to the transportation direction, the setting section further enabling or disabling a second function of barcode printing; and a print controlling section that controls printing in accordance with setting of each of the first function and the second function, wherein the setting section disables, when one of the first function and the second function is enabled, the other function.

With such a print control program, exclusive setting control is performed on the first function and the second function. Thus, it is possible to perform print control for printing bar codes in high quality free from quality variation.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, an exemplary embodiment of the present invention will now be explained.

Figure 1:
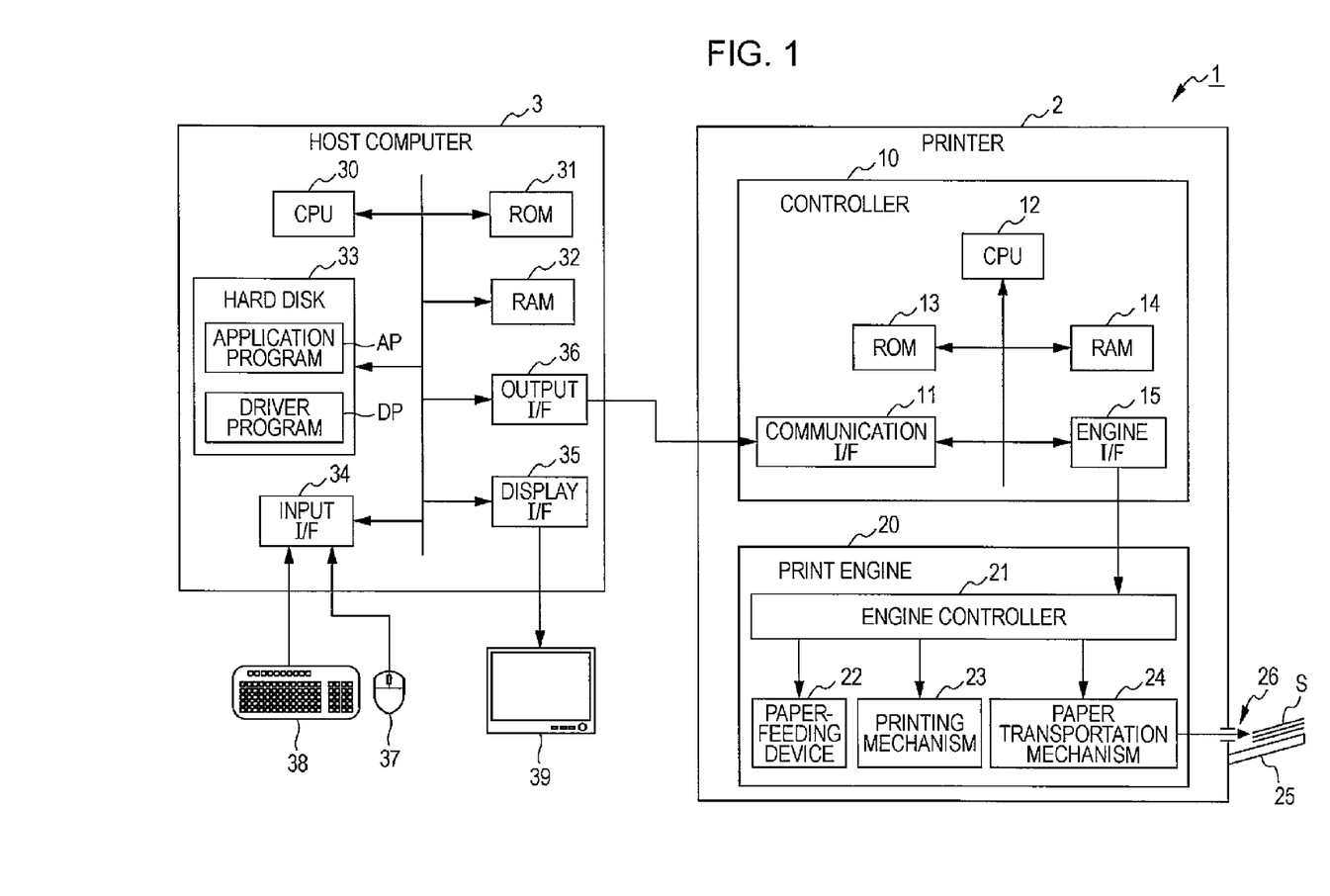
FIG. 1 is a block diagram that schematically illustrates an example of the configuration of a printing system according to an exemplary embodiment of the invention.

FIG. 1 is a block diagram that schematically illustrates an example of the configuration of a printing system according to an exemplary embodiment of the invention. As illustrated in FIG. 1, a printing system 1 is provided with a printer 2 and a host computer 3. The printer 2 is an example of a printing apparatus according to an aspect of the invention. The host computer 3 is an example of a print control apparatus according to an aspect of the invention. The printing system 1 has a function of sorting paper by switching paper-ejection orientation alternately between a longitudinal direction and a lateral direction. The orientation is switched over for every copy. This sorting function may be hereinafter referred to as a "separate printing function". The printing system 1 has another function of printing a bar code (barcode printing function). The separate printing function is an example of "a first function" according to an aspect of the invention. The barcode printing function is an example of "a second function" according to an aspect of the invention. In the following description, a series of operation in separate printing that includes the transportation of a sheet of printing paper in the longitudinal direction along the long edges thereof, the formation of an image thereon for printing, and the ejection of the printed sheet in the longitudinal direction may be referred to as "longitudinal printing". A series of operation that includes the transportation of a sheet of printing paper in the lateral direction along the short edges thereof, the formation of an image thereon for printing, and the ejection of the printed sheet in the lateral direction may be hereinafter referred to as "lateral printing".

The configuration of the printer 2 is explained below. As illustrated in FIG. 1, the printer 2 is provided with a controller 10 and a print engine 20. A stacker 25 is provided as an external tray on a side of the printer 2. Ejected sheets of paper are stacked one on another over the stacker 25.

The controller 10 controls the entire operation of the printer 2 including the print engine 20. The controller 10 is provided with a communication I/F 11, a CPU 12, a ROM 13, a RAM 14, and an engine I/F 15.

The communication I/F 11 is an interface unit to which the host computer 3 is connected. Various kinds of programs that are run for controlling the printer 2 have been stored in the ROM 13 in advance. The RAM 14 is a general-purpose memory that is used as, for example, a variety of buffers such as a reception buffer or as a work area. The CPU 12 executes programs that are stored in the ROM 13 to control the operation of the printer 2. The engine I/F 15 is an interface unit that provides interface with the print engine 20.

The print engine 20 includes an engine controller 21, a paper-feeding device 22, a printing mechanism 23, and a paper transportation mechanism 24.

The engine controller 21 is a unit that controls the internal processing of the print engine 20. In accordance with instructions given from the controller 10, the engine controller 21 controls the operation of the paper-feeding device 22, the printing mechanism 23, and the paper transportation mechanism 24.

A longitudinal paper-feeding cartridge and a lateral paper-feeding cartridge are detachably attached to the paper-feeding device 22. Sheets of paper for longitudinal printing are set in the longitudinal paper-feeding cartridge. The sheets of paper for longitudinal printing are fed in the long-edge direction thereof. That is, the paper-feeding direction coincides with the long-edge direction of the longitudinal-printing paper. Sheets of paper for lateral printing are set in the lateral paper-feeding cartridge. The sheets of paper for lateral printing are fed in the short-edge direction thereof. That is, the paper-feeding direction coincides with the short-edge direction of the lateral-printing paper. The paper-feeding device 22 selects either the longitudinal paper-feeding cartridge or the lateral paper-feeding cartridge for feeding a sheet(s) to the printing mechanism 23. Therefore, the paper-feeding device 22 is configured to be able to feed the longitudinal-printing paper and the lateral-printing paper selectively.

The printing mechanism 23 includes an electrostatic charging unit, a light exposure unit, a photosensitive member, a developing unit, an image transfer unit, an image fixation unit, toner cartridges, and the like. The photosensitive member is a drum unit that has a cylindrical conductive base substrate and a photosensitive layer formed on the outer circumferential surface of the cylindrical conductive base substrate. The photosensitive member can rotate around its center axis/shaft. The electrostatic charging unit electrifies the photosensitive member. Then, the light exposure unit exposes the photosensitive member, for example, by irradiating a beam of light to form a latent image thereon. The developing unit develops the latent image with the use of toners. The image transfer unit transfers the developed toner image to a print target medium such as a sheet of paper. The image fixation unit includes an image fixation roller, a driving motor, a heater, and the like. An elastic body such as a rubber member covers the roller surface of the image fixation roller. The driving motor supplies driving power for the rotation of the image fixation roller. The heater applies heat to the image fixation roller. The transferred toner image is thermally fixed to a sheet of printing paper. As a result, an image is formed thereon. That is, the printing mechanism 23 prints an image by means of an electro-photographic image formation method.

The paper transportation mechanism 24 transports a sheet of paper S on which an image has been formed by the printing mechanism 23 and then ejects the sheet S to the stacker 25 through an ejection port. A plurality of ejected sheets S is stacked on the stacker 25.

In the operation of the printer 2 that has the configuration explained above, the paper-feeding device 22 feeds sheets of longitudinally oriented paper S and sheets of laterally oriented paper S alternately with an orientation switchover for each print copy, for example, for each one set of sheets that are to be outputted. The printing mechanism 23 sequentially forms an image on the sheets S that are fed one after another. Subsequently, the paper transportation mechanism 24 ejects the sheets S on which the image has been formed to the stacker 25. As a result of alternate execution of longitudinal printing and lateral printing, which may be hereinafter referred to as "alternate longitudinal/lateral printing", the printed sheets S are stacked over the stacker 25 in a sorted manner. That is, stacked-sheet orientation is alternated between longitudinal orientation and lateral orientation with an orientation switchover for each print copy for the purpose of sorting. In this way, multiple-copy printing with the use of the separate printing function is realized.

For each of the separate printing function and the barcode printing function, the host computer 3 performs control for enabling or disabling the function. Next, the configuration of the host computer 3 is explained below.

The host computer 3 is, for example, a general-purpose personal computer. The host computer 3 is provided with a CPU 30, a ROM 31, a RAM 32, a hard disk 33, an input I/F 34, a display I/F 35, and an output I/F 36. The input I/F 34 is an interface unit to which input devices such as a mouse 37, a keyboard 38, and the like are connected. The input devices are an example of an operating section according to an aspect of the invention. Operation signals corresponding to user manipulation are inputted from the input devices through the input I/F 34. The display I/F 35 is an interface unit to which a display device 39 is connected. The display device 39 is an example of a displaying section according to an aspect of the invention. The display I/F 35 controls display by outputting screen display data to the display device 39. The output I/F 36 is an interface unit that provides interface with the printer 2. The output I/F 36 of the host computer 3 is connected to the communication I/F 11 of the printer 2 so that data communication can be performed therebetween.

An application program AP and a driver program DP are stored in the hard disk 33. The driver program DP is an example of a print control program according to an aspect of the invention. Specifically, the application program AP and the driver program DP are pre-stored in a storage medium that is inserted into a slot of the host computer 3. The host computer 3 is provided with a media reader, which is not illustrated in the drawing. The media reader reads the application program AP and the driver program DP out of the storage medium. The read programs are recorded in the hard disk 33. The application program AP and the driver program DP can be pre-stored in various kinds of computer-readable storage media including but not limited to a flexible disk, an optical disk such as a CD-ROM or a DVD-ROM, a magneto-optical disk, a memory card, and a portable hard disk. Or, the application program AP and the driver program DP may not be pre-stored in a storage medium. For example, the host computer 3 may download the programs AP and DP from a server via an electric telecommunication line. By this means, these programs can be stored into the hard disk 33 without using any storage medium.

Figure 2:
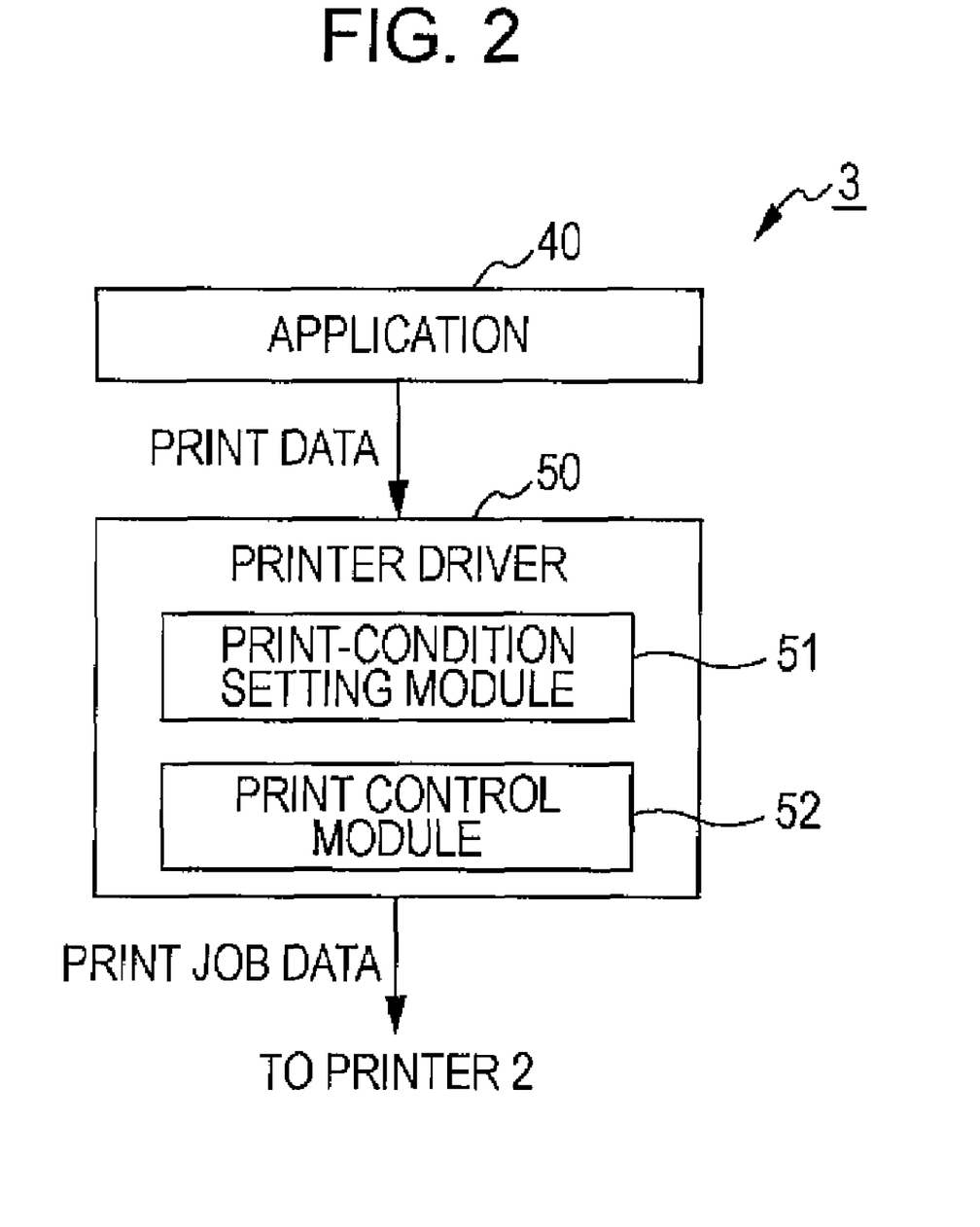
FIG. 2 is a block diagram that schematically illustrates an example of the software architecture of a host computer according to an exemplary embodiment of the invention.

Next, the software architecture of the host computer 3 is explained below. FIG. 2 is a block diagram that schematically illustrates an example of the software architecture of the host computer 3 according to an exemplary embodiment of the invention. As illustrated in FIG. 2, the host computer 3 includes an application 40 and a printer driver 50.

The application 40 is, for example, document preparation software that functions under the execution of the application program AP. The application 40 creates print data that includes description of objects such as text, graphics, and images on the basis of input operation made by a user by means of the mouse 37 and the keyboard 38. The application 40 can specify a barcode font(s) in addition to usual character fonts. The barcode font is a special font that is used for commanding the conversion of an inputted character string into a bar code for printing. When a user inputs a character string for which a barcode font is specified through the manipulation of inputting devices, print data for barcode printing that includes an object of a bar code is created. Then, the application 40 sends the created print data to the printer driver 50.

The printer driver 50 is software that controls printing performed by the printer 2. The printer driver 50 includes a print-condition setting module 51 and a print control module 52. The print-condition setting module 51 is an example of a setting section according to an aspect of the invention. The print control module 52 is an example of a print controlling section according to an aspect of the invention. The CPU 30 reads out the driver program DP that is stored in the hard disk 33 and executes the read program to implement the functions of these modules.

The print-condition setting module 51 is a functional component that sets various printing conditions such as sheet type designation, paper orientation for ejection, and the like. For each of the barcode printing function and the separate printing function, the print-condition setting module 51 performs setting operation for enabling or disabling the function.

In addition, the print-condition setting module 51 performs processing for displaying various kinds of setting windows on the display screen of the display device 39, thereby allowing a user to configure the settings for various printing conditions. For example, the various setting windows include a print setting window and a paper-ejection setting window. The settings for the barcode printing function are configured on the print setting window. The settings for the separate printing function are configured on the paper-ejection setting window.

Figure 3:
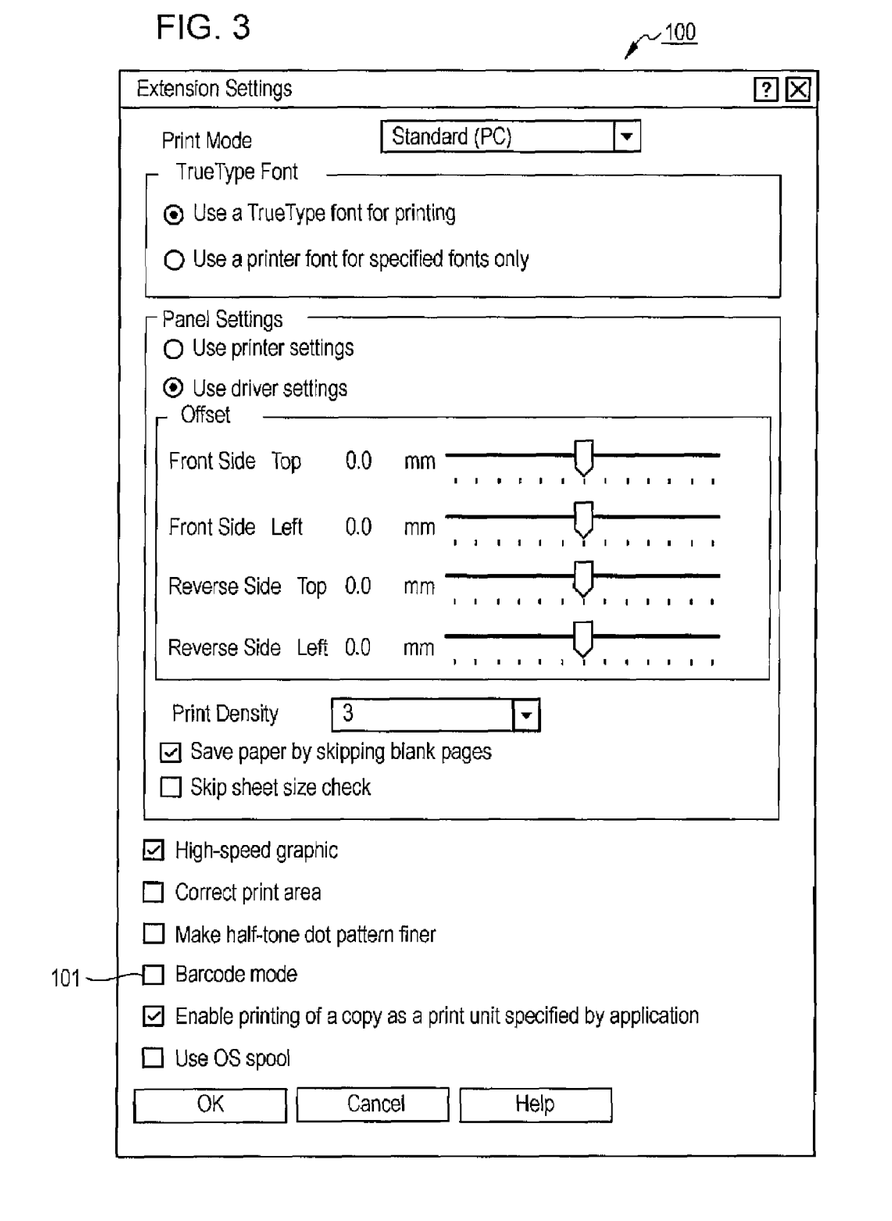
FIG. 3 is a diagram that schematically illustrates an example of a print setting window according to an exemplary embodiment of the invention.

FIG. 3 is a diagram that schematically illustrates an example of a print setting window according to an exemplary embodiment of the invention. As illustrated in FIG. 3, a print setting window 100 includes a setting input window area including columns, check boxes, radio buttons, and fields, though not necessarily limited thereto, for setting a print mode and the like. The print setting window 100 includes a barcode mode check box 101 as one of the plurality of check boxes. The barcode mode check box 101 is provided for setting a barcode mode ON/OFF. The barcode mode check box 101 is an example of a second setting input area item according to an aspect of the invention. A user can manipulate input devices such as the mouse 37 and the like to set the check box 101 ON or OFF, thereby enabling or disabling the barcode mode. The barcode mode is a mode for outputting a barcode image in high quality. When the barcode mode check box 101 is set ON, the print-condition setting module 51 enables the barcode printing function. As a result, printing conditions that are suitable for barcode printing, including but not limited to print density (i.e., the lightness/darkness of printing) and resolution, are automatically set.

Figure 4:
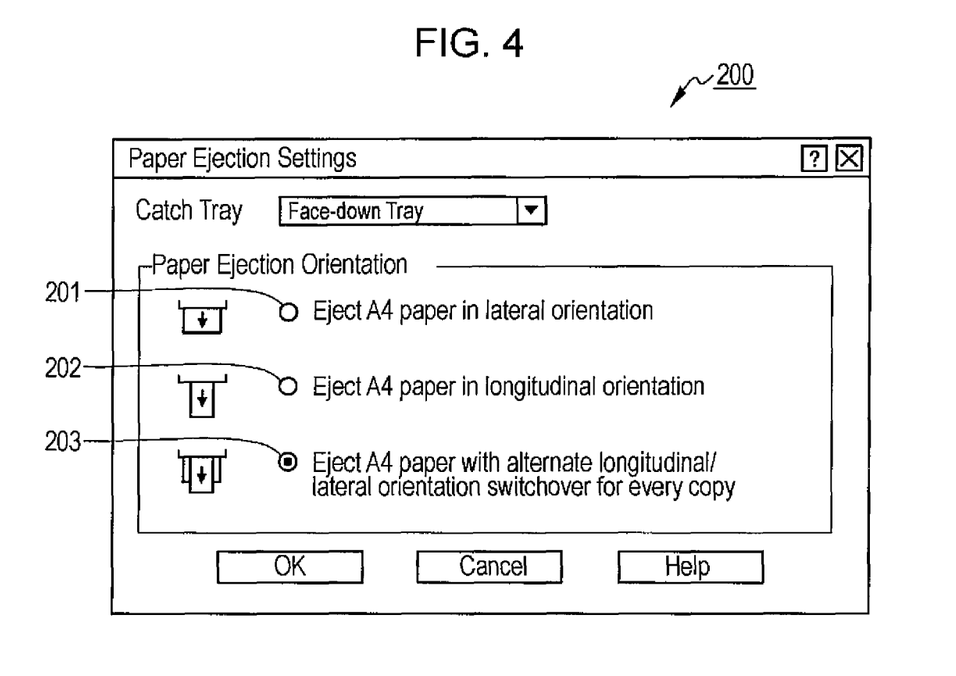
FIG. 4 is a diagram that schematically illustrates an example of a paper-ejection setting window according to an exemplary embodiment of the invention.

FIG. 4 is a diagram that schematically illustrates an example of a paper-ejection setting window according to an exemplary embodiment of the invention. As illustrated in FIG. 4, a paper-ejection setting window 200 includes a landscape ejection radio button 201, a portrait ejection radio button 202, and an alternate paper orientation switchover radio button 203. The selection button 201 is used for commanding the ejection of sheets of A4 paper in the lateral orientation.

The selection button 202 is used for commanding the ejection of sheets of A4 paper in the longitudinal orientation. The selection button 203 is used for commanding the ejection of sheets of A4 paper while switching paper orientation alternately between the longitudinal direction and the lateral direction for every copy. The selection button 203 is an example of a first setting input area item according to an aspect of the invention. A user can manipulate input devices such as the mouse 37 and the like to choose a desired button, thereby setting the orientation of paper for ejection arbitrarily. When the button 203 is selected, the print-condition setting module 51 enables the separate printing function with an alternate paper orientation switchover between the longitudinal direction and the lateral direction for ejection. When the button 201 or the button 202 is selected, the print-condition setting module 51 disables the separate printing function.

The print control module 52 controls printing by performing print job data creation processing, print request processing, and the like. Specifically, the print control module 52 creates print job data on the basis of print data received from the application 40 in accordance with the setting of the barcode printing function or the separate printing function. The print control module 52 sends the created print job data to the printer 2 and requests for the execution of printing.

When the printer 2 performs barcode print processing, the print quality of a bar code that is outputted as a result of longitudinal printing may differ from the print quality of a bar code that is outputted as a result of lateral printing. In such a case, a significant difference arises between the barcode read rate of the former and the barcode read rate of the latter, both of which are read by a barcode reader. For this reason, when the separate printing function is used for barcode printing, the quality of a bar code that is printed by means of either one of the longitudinal printing and the lateral printing is lower than the quality of a bar code that is printed by means of the other. Therefore, barcode quality is not uniform. This means that quality deteriorates contrary to the supposed effect/advantage of the barcode printing function, which aims at printing a bar code in high quality, if both of the barcode printing function and the separate printing function are enabled for printing.

Therefore, in the present embodiment of the invention, when one of the barcode printing function and the separate printing function is enabled, the print-condition setting module 51 disables the other function forcibly. With such exclusive enabling of the barcode printing function and the separate printing function, it is possible to reduce variation in barcode quality.

Next, processing for exclusive controlling of the barcode printing function and the separate printing function, which is performed by the printer driver 50, is explained below.

Figure 5:
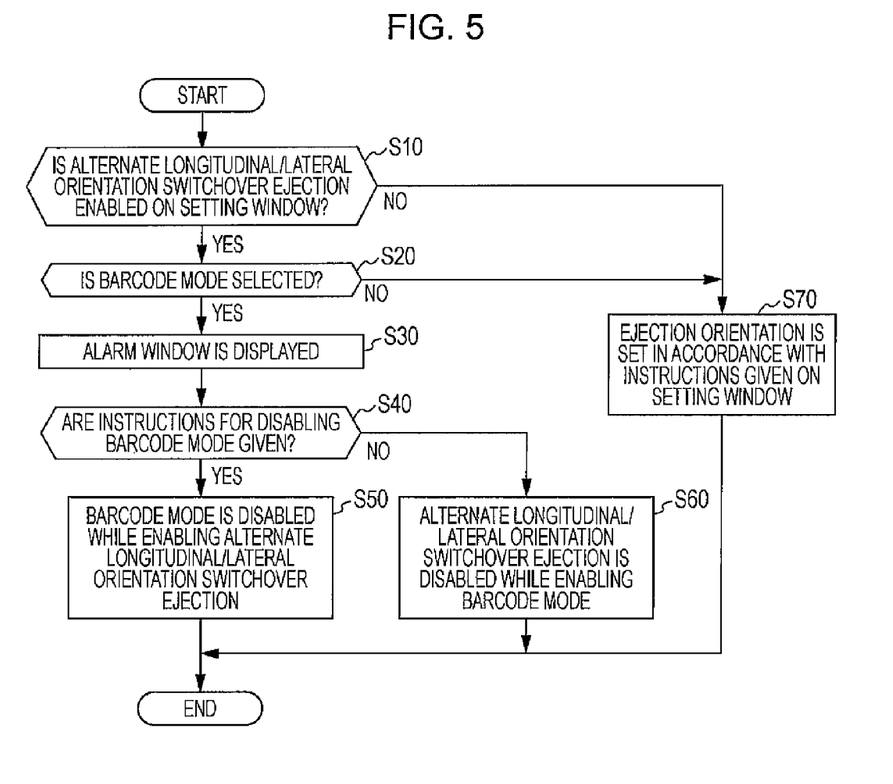
FIG. 5 is a flowchart that schematically illustrates an example of the processing flow of exclusive control on a barcode printing function and a separate printing function according to an exemplary embodiment of the invention.

Processing illustrated in a flowchart of FIG. 5 is initiated at the time when a user depresses an OK button after the selection of one of the choice buttons 201, 202, and 203 on the paper-ejection setting window 200. In the following description, it is assumed that the user has enabled or disabled the barcode printing function on the print setting window 100 prior to the initiation of a processing flow illustrated in FIG. 5.

Upon the start of processing, the print-condition setting module 51 judges whether alternate longitudinal/lateral paper-orientation switchover ejection is commanded or not (step S10). If the selection button 203 of the paper-ejection setting window 200 is set ON, the print-condition setting module 51 judges that alternate longitudinal/lateral paper-orientation switchover ejection is commanded (step S10: YES). In this case, the process proceeds to a step S20.

In the step S20, the print-condition setting module 51 judges whether the barcode mode is selected or not. If a check mark is placed in the barcode mode check box 101 of the print setting window 100, the print-condition setting module 51 judges that the barcode mode is selected (step S20: YES). In this case, the process proceeds to a step S30.

Figure 6:
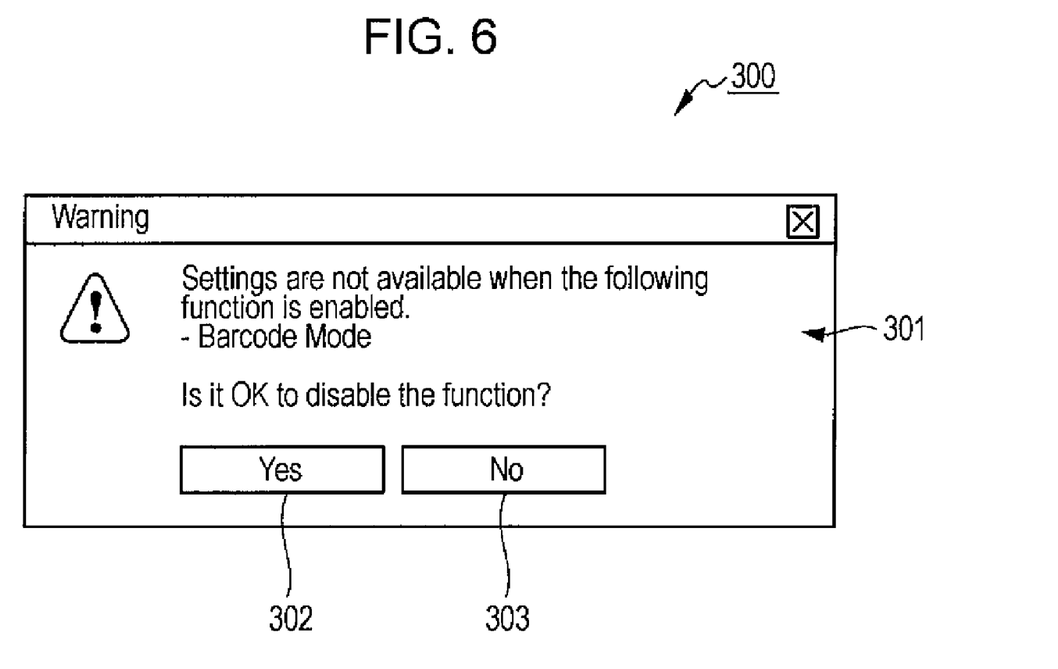
FIG. 6 is a diagram that schematically illustrates an example of an alarm window according to an exemplary embodiment of the invention.

In the step S30, since both of the separate printing function with alternate longitudinal/lateral paper-orientation switchover ejection and the barcode printing function under the barcode mode are enabled, the print-condition setting module 51 causes the display device 39 to display an alarm window, which shows an alerting message to the user to the effect that the separate printing function and the barcode printing function cannot be enabled at the same time. FIG. 6 is a diagram that schematically illustrates an example of an alarm window according to an exemplary embodiment of the invention. As illustrated in FIG. 6, an alarm window 300 includes an alerting message 301, which informs a user that the separate printing function with alternate longitudinal/lateral paper-orientation switchover ejection and the barcode printing function cannot be enabled at the same time and prompts the user to change the selection state of a barcode mode from an enabled state to a disabled state, an OK button 302 for approving the mode setting change to make it valid, and a cancellation button 303 for disapproving the mode setting change. As informed and prompted by the content of the message 301, the user selects either one of the separate printing function with alternate longitudinal/lateral paper-orientation switchover ejection and the barcode printing function under the barcode mode whichever they prefer. If the separate printing function should be preferentially enabled, the user clicks the OK button 302. If the barcode printing function should be preferentially enabled, the user clicks the cancellation button 303.

Figure 7:
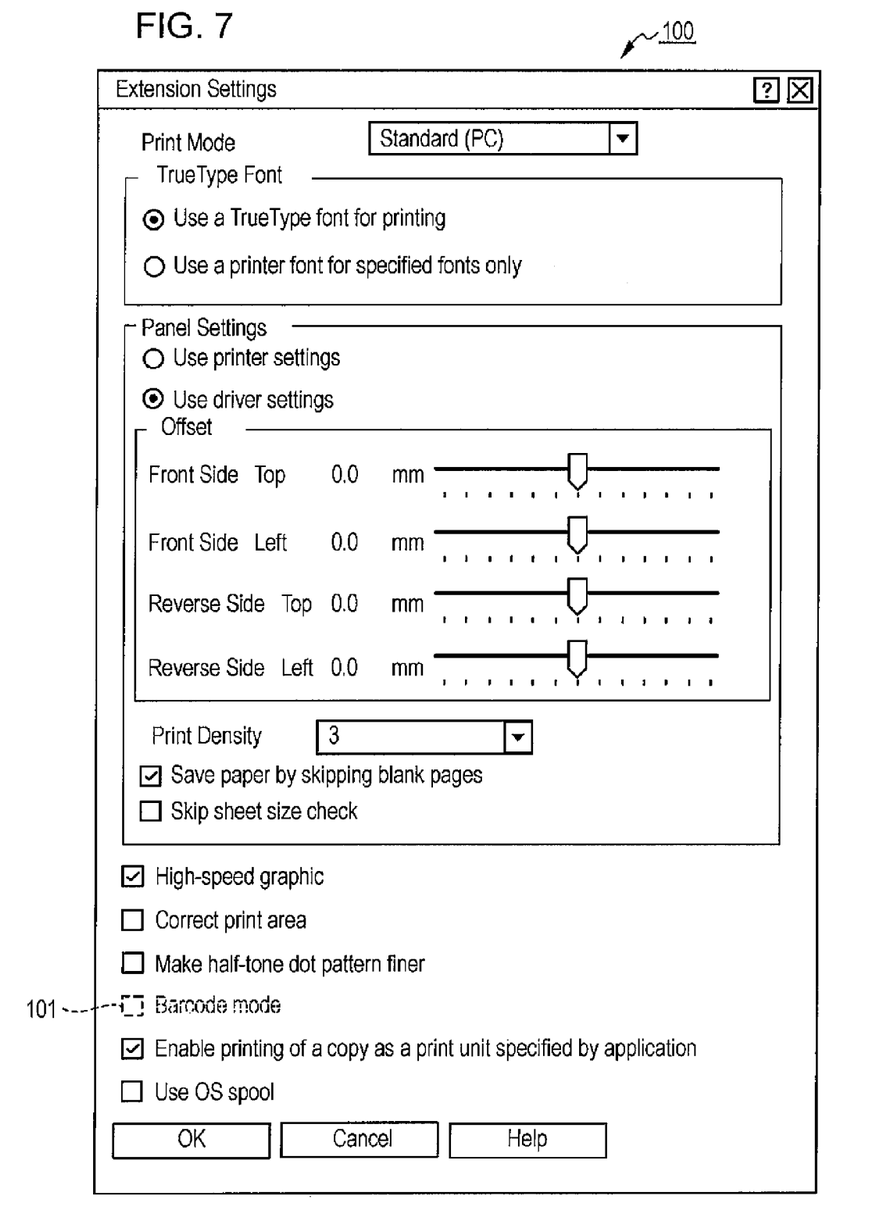
FIG. 7 is a diagram that schematically illustrates an example of a print setting window according to an exemplary embodiment of the invention.

Next, the print-condition setting module 51 judges whether the barcode mode should be disabled or not on the basis of the instructions given by the user (step S40). If the user clicks the OK button 302 on the alarm window 300, the print-condition setting module 51 judges that the barcode mode should be changed into a mode OFF state (step S40: YES). Accordingly, the print-condition setting module 51 preferentially enables the separate printing function with alternate longitudinal/lateral paper-orientation switchover ejection while disabling the barcode printing function (step S50). In this case, the display state of the barcode mode check box 101 is changed into a "grayout" state on the subsequent display of the print setting window 100 so as to indicate that the mode selection thereof is not available (refer to the broken-line part of FIG. 7). Since the check box 101 is grayed out, the barcode mode cannot be set ON thereafter. By this means, exclusive control is ensured so that the barcode printing function cannot be enabled when the separate printing function is enabled. Even after the disabling of the check box 101 of the print setting window 100, the user can release the grayout state of the check box 101 to return it to its original normal state by selecting either the selection button 201 or the selection button 202 on the paper-ejection setting window 200.

On the other hand, if the user clicks the cancellation button 303 on the alarm window 300, the print-condition setting module 51 judges that the barcode mode should remain in a mode ON state (step S40: NO). Accordingly, the print-condition setting module 51 preferentially enables the barcode printing function while disabling the separate printing function with alternate longitudinal/lateral paper-orientation switchover ejection (step S60).

As explained above, only one function that is preferred by the user is enabled through the step S50 or the step S60. Therefore, exclusive control is performed to make sure that the separate printing function with alternate longitudinal/lateral paper-orientation switchover ejection and the barcode printing function under the barcode mode are never enabled at the same time. Upon the completion of processing in the step S50 or the step S60, the processing flow illustrated in FIG. 5 ends.

If either the selection button 201 or the selection button 202 of the paper-ejection setting window 200 is set ON (step S10: NO), the processing proceeds to a step S70. In addition to such a case, if it is judged that the barcode mode is not selected (step S20: NO), the processing proceeds to the step S70. In the step S70, since the separate printing function and the barcode printing function are not enabled concurrently, exclusive control is not performed. Accordingly, the orientation of paper for ejection is set in accordance with the instructions given by user on the setting window. The processing flow illustrated in FIG. 5 ends after the step S70.

As explained above, in the present embodiment of the invention, since exclusive control is performed on the barcode printing function under the barcode mode and the separate printing function with alternate longitudinal/lateral paper-orientation switchover ejection (alternate longitudinal/lateral printing), these two functions are never enabled at the same time. With such exclusive control, when a user desires to print bar codes in high quality with the barcode printing function being enabled, it is possible to prevent the output quality of some bar codes from being lower than that of the others due to alternate longitudinal/lateral printing, thereby avoiding non-uniform barcode quality. Thus, it is possible to print bar codes in high quality, which is free from quality variation.

Although an exemplary embodiment of the invention is explained in detail above, the invention is not limited to the foregoing embodiment. That is, the invention may be configured and/or implemented in a variety of variations and/or modifications without departing from the spirit and scope thereof. Variation examples of the foregoing embodiment of the invention are explained below.

Variation Example 1

In the foregoing exemplary embodiment of the invention, it is explained that an alarm window is displayed for exclusive control when alternate longitudinal/lateral paper-orientation switchover ejection is enabled after the presetting of a barcode mode in an enabled (ON) state. However, the manner of exclusive control is not limited to such an example. For example, exclusive control may be implemented as follows; when a user places a check mark in the check box 101 of the print setting window 100 with an intention to enable the barcode printing function when the separate printing function with alternate longitudinal/lateral paper-orientation switchover ejection has been enabled by presetting, an alarm window is displayed so as to prompt the user to select one preferred function.

Variation Example 2

In the foregoing exemplary embodiment of the invention, the barcode printing function, which automatically sets printing conditions that are suitable for barcode printing including but not limited to the lightness/darkness of printing and resolution in order to output bar codes in high quality, is explained as an example of "a second function" according to an aspect of the invention. Notwithstanding the above, the second function may be implemented as the function of barcode printing itself. For example, the printer driver 50 is allowed to use a barcode font when the barcode mode is set ON only. Accordingly, the printer driver 50 is not allowed to use any barcode font when the barcode mode is set OFF. With such a modified configuration, it is possible to prevent the printing of bar codes in low quality with greater reliability.

Variation Example 3

The print-condition setting module 51 may judge whether a bar code font is included in print data or not for performing exclusive control on the basis of the judgment. That is, the barcode printing function may be enabled whereas the separate printing function may be disabled for exclusive control if a bar code font is included in the print data.

Variation Example 4

In the foregoing exemplary embodiment of the invention, an alarm window is displayed so as to prompt a user to select one preferred function. As a variation example, exclusive control may be carried out forcibly without displaying any alarm window. For example, when a user commands on the paper-ejection setting window 200 that the separate printing function should be enabled under a preset condition in which the barcode printing function has been enabled in advance, the separate printing function is enabled while disabling the barcode printing function for forcible exclusive control, which means that a newer user command takes precedence over older one. Or, which one of the separate printing function and the barcode printing function should take precedence over the other and should be preferentially enabled for forcible exclusive control may have been determined in advance.

Variation Example 5

In the foregoing exemplary embodiment of the invention, it is explained that alternate longitudinal/lateral paper-orientation ejection is performed with an orientation switchover for each copy. That is, it is explained above that the orientation is switched over between longitudinal printing and lateral printing alternately where a copy is the unit of switchover. However, the unit of switchover is not limited to a copy. The orientation may be alternately switched over therebetween while taking a print job as the unit of switchover. Or, the unit of switchover may be a predetermined number of pages. For example, exclusive control may be performed on the barcode printing function and a job-by-job separate printing function according to which orientation is switched over between longitudinal printing and lateral printing alternately with a switchover for each print job.

Variation Example 6

In the foregoing exemplary embodiment of the invention, it is explained that exclusive settings of the separate printing function with alternate longitudinal/lateral paper-orientation switchover ejection and the barcode printing function are configured from a host-computer side. Notwithstanding the above, settings may be configured through the manipulation of an operation panel provided on a printer. For example, when a printer receives print job data that contains an instruction for enabling the barcode printing function under a preset condition in which the separate printing function with alternate longitudinal/lateral paper-orientation switchover ejection has been enabled in advance through the manipulation of an operation panel provided on the printer, a controller of the printer disables the separate printing function for exclusive control. The printer controller is another example of the print control apparatus according to an aspect of the invention.

Variation Example 7

In the foregoing exemplary embodiment of the invention, an electro-photographic printer is taken as an example. However, the scope of the invention is not limited thereto. The technical concept of the invention whose examples are explained above can be applied to various apparatuses that employ other printing methods/schemes such as an ink-jet printing method, a thermal transfer printing method, and the like. That is, the concept of the invention is applicable when barcode print quality varies depending on orientation. The invention can be embodied not only as a printer but also as various kinds of apparatuses including a copier, a multi-function machine, and a facsimile without any limitation thereto.

The entire disclosure of Japanese Patent Application No. 2008-263576, filed Oct. 10, 2008 is expressly incorporated by reference herein.

What is claimed is:

1. A print control apparatus comprising:
a setting section that enables or disables a first function of sorting paper by performing longitudinal printing in which printing is performed in longitudinal orientation for paper ejection in the longitudinal orientation and lateral printing in which printing is performed in lateral orientation for paper ejection in the lateral orientation alternately, the longitudinal orientation being an orientation in which an extending direction of long edges of a sheet of paper coincides with a direction of transportation of the sheet of paper, the lateral orientation being an orientation in which the extending direction of the long edges of the sheet of paper coincides with a direction orthogonal to the transportation direction, the setting section further enabling or disabling a second function of barcode printing; and
a print controlling section that controls printing in accordance with setting of each of the first function and the second function,
wherein the setting section disables, when one of the first function and the second function is enabled, the other function.

2. The print control apparatus according to claim 1, further comprising:
an operating section that is used for input operation; and
a displaying section that performs screen picture display,
wherein the setting section causes the displaying section to display screen picture that contains a first setting input area item that is used for setting the first function and a second setting input area item that is used for setting the second function, and
when a command for enabling the first function or the second function is given as setting of the first setting input area item or the second setting input area item as a result of input operation performed by means of the operating section, the setting section enables the commanded function and renders the setting input area item for the other function dead.

3. The print control apparatus according to claim 1, further comprising:
an operating section that is used for input operation; and
a displaying section that performs screen picture display,
wherein the setting section causes the displaying section to display screen picture that prompts a user to select either one of the first function and the second function when it is commanded that, when one of the first function and the second function is enabled, the other function should also be enabled as a result of input operation performed by means of the operating section, and then enables only one function that is selected by the user as a result of input operation performed by means of the operating section.

4. A print control method comprising:

setting for enabling or disabling a first function of sorting paper by performing longitudinal printing in which printing is performed in longitudinal orientation for paper ejection in the longitudinal orientation and lateral printing in which printing is performed in lateral orientation for paper ejection in the lateral orientation alternately, the longitudinal orientation being an orientation in which an extending direction of long edges of a sheet of paper coincides with a direction of transportation of the sheet of paper, the lateral orientation being an orientation in which the extending direction of the long edges of the sheet of paper coincides with a direction orthogonal to the transportation direction, and further enabling or disabling a second function of barcode printing; and controlling printing in accordance with setting of each of the first function and the second function, wherein, when one of the first function and the second function is enabled, the other function is disabled.

5. A computer-readable storage medium for a recording print control program for controlling a printing apparatus, the print control program causing a computer to function as:

a setting section that enables or disables a first function of sorting paper by performing longitudinal printing in which printing is performed in longitudinal orientation for paper ejection in the longitudinal orientation and lateral printing in which printing is performed in lateral orientation for paper ejection in the lateral orientation alternately, the longitudinal, orientation being an orientation in which an extending direction of long edges of a sheet of paper coincides with a direction of transportation of the sheet of paper, the lateral orientation being an orientation in which the extending direction of the long edges of the sheet of paper coincides with a direction orthogonal to the transportation direction, the setting section further enabling or disabling a second function of barcode printing; and a print controlling section that controls printing in accordance with setting of each of the first function and the second function, wherein the setting section disables, when one of the first function and the second function is enabled, the other function.

\* \* \* \* \*